United States Patent [19]
Wozny et al.

[11] Patent Number: 6,040,370
[45] Date of Patent: *Mar. 21, 2000

[54] AQUEOUS FLUOROPOLYMER DISPERSION AND METHOD FOR MAKING FLUOROPOLYMER-CONTAINING THERMOPLASTIC RESIN COMPOSITION

[75] Inventors: Mary Ellen Wozny, Coolville, Ohio; Ralph P. Chambers, Parkersburg; James L. Bland, Elizabeth, both of W. Va.

[73] Assignee: General Electric Company, Pittsfield, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,830

[22] Filed: Apr. 17, 1997

[51] Int. Cl.⁷ ....................................................... C08K 5/04
[52] U.S. Cl. ............................................................ 524/394
[58] Field of Search .................................... 524/394, 273, 524/399, 400

[56] References Cited

U.S. PATENT DOCUMENTS

| | | | |
|---|---|---|---|
| 3,671,487 | 6/1972 | Abolins | 260/40 R |
| 3,723,373 | 3/1973 | Lucas | 260/29.6 F |
| 3,853,809 | 12/1974 | Martin et al. | 260/42.37 |
| 3,980,596 | 9/1976 | Leverett | 260/23 |
| 4,469,846 | 9/1984 | Khan et al. | 525/72 |
| 4,574,141 | 3/1986 | Cheng et al. | 525/252 |
| 4,579,906 | 4/1986 | Zabrocki et al. | 525/72 |
| 4,767,821 | 8/1988 | Lindner et al. | 525/72 |
| 4,810,739 | 3/1989 | Lindner et al. | 524/371 |
| 4,877,839 | 10/1989 | Conti-Ramsden et al. | 525/200 |
| 4,904,726 | 2/1990 | Mogan et al. | 524/526 |
| 5,010,121 | 4/1991 | Yeates et al. | 523/336 |
| 5,102,696 | 4/1992 | Pan et al. | 427/422 |
| 5,324,785 | 6/1994 | Noda et al. | 525/276 |
| 5,411,999 | 5/1995 | Gallucci | 523/336 |
| 5,494,752 | 2/1996 | Shimizu et al. | 428/407 |
| 5,521,230 | 5/1996 | Bhatia et al. | 523/328 |
| 5,539,036 | 7/1996 | Fong et al. | 524/373 |

FOREIGN PATENT DOCUMENTS

| | | |
|---|---|---|
| 0 166 187 A2 | 5/1985 | European Pat. Off. . |
| 0 739 914 A1 | 10/1996 | European Pat. Off. . |
| 2 733 503 A1 | 4/1995 | France . |
| 3 903 547 | 8/1990 | Germany . |

OTHER PUBLICATIONS

Monomer Reactivity Ratios in Graft Copolymerization, Journal of Polymer Science Part A–1, vol. 9, 91–105 (1971).

*Primary Examiner*—Edward J. Cain

[57] ABSTRACT

A stabilized aqueous fluoropolymer dispersion includes a fluoropolymer and a fatty acid salt. A fluoropolymer additive is made by aqueous emulsion polymerization of one or more ethylenically unsaturated monomers in the presence of the stabilized fluoropolymer dispersion or, alternatively, by co-coagulation of the stabilized fluoropolymer dispersion and an aqueous emulsion of a second polymer. A fluoropolymer-containing thermoplastic resin composition is made by combining the fluoropolymer additive with a thermoplastic resin.

22 Claims, No Drawings

AQUEOUS FLUOROPOLYMER DISPERSION AND METHOD FOR MAKING FLUOROPOLYMER-CONTAINING THERMOPLASTIC RESIN COMPOSITION

FIELD OF THE INVENTION

The present invention relates to the use of fluoropolymers as additives in thermoplastic resin compositions and, more particularly, to a stabilized aqueous fluoropolymer dispersion and to a method for making a fluoropolymer-containing thermoplastic resin composition.

BACKGROUND OF THE INVENTION

The use of fluoropolymers, particularly polytetrafluoroethylene ("PTFE"), as anti-drip and flame retardant additives in thermoplastic resin compositions is known. Since direct incorporation of a fluoropolymer into a thermoplastic resin matrix tends to be difficult, fluoropolymer-containing anti-drip and flame retardant additives typically take the form of a fluoropolymer that has been pre-blended in some manner with a small amount of a second polymer. For example, U.S. Pat. No. 5,521,230 discloses steam precipitation of an aqueous dispersion of PTFE and a polycarbonate resin to form a PTFE concentrate for use as a drip inhibitor additive in thermoplastic resin composition. U.S. Pat. No. 4,579,906 discloses melt blending a PTFE-thermoplastic resin powder with a thermoplastic resin matrix, e.g., a SAN or ABS matrix, and other flame retardant additives to produce a flame retardant thermoplastic resin composition. The PTFE-thermoplastic resin powder of the '906 patent is made by co-coagulating an aqueous PTFE dispersion that is stabilized with an ethoxylated nonyl phenol surfactant with an aqueous styrene-acrylonitrile ("SAN") resin emulsion or an aqueous acrylonitrile-butadiene-styrene ("ABS") resin emulsion and then precipitating and drying the co-coagulated PTFE-thermoplastic resin composition to provide a PTFE-thermoplastic resin powder.

While techniques for incorporating fluoropolymers into flame retardant thermoplastic resin compositions are known, further improvements are desirable. Known techniques typically employ aqueous fluoropolymer dispersions, which are typically stabilized with an ethoxylated nonyl phenol surfactant. Use of ethoxylated nonyl phenol surfactants is under scrutiny from the perspective of environmental safety and alternative approaches to stabilizing aqueous fluoropolymer dispersions are highly desirable. The amount of fluoropolymer that can be incorporated in a fluoropolymer-thermoplastic resin composition by co-coagulation techniques is limited and would be desirable to provide a fluoropolymer-containing additive having a higher fluoropolymer content. Co-coagulated fluoropolymer-thermoplastic resin compositions tend to be very difficult to handle due to clumping and poor flowability and it is correspondingly difficult to incorporate such additives uniformly and reproducibly into a thermoplastic resin composition. Non-uniform distribution of fluoropolymer additive within a thermoplastic resin composition may result in, e.g., surface imperfections, such as e.g., streaking and splay, and in inconsistent combustion performance, such as, e.g., uneven shrink rates and dripping. A fluoropolymer-thermoplastic resin additive that is in the form of a free-flowing powder would be highly desirable from both the perspective of material handling and the perspective of improving the uniformity and reproducibility of the thermoplastic resin compositions made therefrom.

SUMMARY OF THE INVENTION

A first aspect of the present invention is directed to an aqueous fluoropolymer dispersion that comprises from 1 part by weight ("pbw") to 80 pbw fluoropolymer per 100 pbw of the dispersion and from 0.1 pbw to 10 pbw of a fatty acid salt per 100 pbw of the fluoropolymer.

The aqueous fluoropolymer dispersion of the present invention is free of ethoxylated nonyl phenol surfactants and exhibits high mechanical stability. The fatty acid salt of the stabilized aqueous fluoropolymer dispersion of the present invention is more effective, on a part-for-part basis, than an ethoxylated nonyl phenol surfactant with respect to stabilizing the fluoropolymer dispersion.

A second aspect of the present invention is directed to a method for making a fluoropolymer additive for thermoplastic resins. The method comprises:

(a) combining a fluoropolymer, said fluoropolymer being in the form of a stabilized aqueous fluoropolymer dispersion comprising (i) from 1 pbw to 80 pbw fluoropolymer per 100 pbw of the dispersion and (ii) from 0.1 pbw to 10 pbw of a fatty acid salt per 100 pbw of the fluoropolymer, with a second polymer;

(b) precipitating the combined fluoropolymer and second polymer to form a precipitate; and (c) drying the precipitate to form the fluoropolymer additive.

The method avoids the use of ethoxylated nonyl phenol and thus does not generate ethoxylated nonyl phenol-containing waste streams. The fluoropolymer additive made by the method is easy to handle, is readily incorporated into thermoplastic resin compositions, and includes a relatively high amount of fluoropolymer.

In a third aspect, the present invention is directed to a method for making a fluoropolymer-containing thermoplastic polymer composition. The method comprises:

(a) combining a fluoropolymer, said fluoropolymer being in the form of a stabilized aqueous fluoropolymer dispersion comprising (i) from 1 pbw to 80 pbw fluoropolymer per 100 pbw of the dispersion and (ii) from 0.1 pbw to 10 pbw of a fatty acid salt per 100 pbw of the fluoropolymer, with a second polymer;

(b) precipitating the combined fluoropolymer and second polymer to form a precipitate; and (c) drying the precipitate to form a fluoropolymer additive; and (d) blending the fluoropolymer additive with a thermoplastic resin to form the fluoropolymer-containing thermoplastic resin composition.

The method avoids the use of ethoxylated nonyl phenol and thus does not generate ethoxylated nonyl phenol-containing waste streams and allows the uniform and reproducible incorporation of a fluoropolymer into a thermoplastic resin composition.

DETAILED DESCRIPTION OF THE INVENTION

I. Stabilized Aqueous Fluoropolymer Dispersion

In a preferred embodiment, the aqueous fluoropolymer dispersion comprises: (i) water, preferably demineralized water, (ii) from 20 to 55 pbw, more preferably from 35 to 45 pbw, fluoropolymer per 100 pbw of dispersion and (iii) from 0.5 to 6 pbw, more preferably from 1 to 4 pbw, of a fatty acid salt per 100 pbw of fluoropolymer.

In a highly preferred embodiment, the stabilized aqueous fluoropolymer dispersion of the present invention consists essentially of water, a fluoropolymer and a fatty acid salt.

(a) Fluoropolymer

Suitable fluoropolymers include homopolymers and copolymers that comprise repeating units derived from one or more fluorinated α-olefin monomers. The term "fluorinated α-olefin monomer" means an α-olefin monomer that includes at least one fluorine atom substituent. Suitable fluorinated α-olefin monomers include, e.g., fluoroethylenes such as, e.g., $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$ and fluoropropylenes such as, e.g., $CF_3CF=CF_2$, $CF_3CF=CHF$, $CF_3CH=CF_2$, $CF_3CH=CH_2$, $CF_3CF=CHF$, $CHF_2CH=CHF$ and $CF_3CH=CH_2$. In a preferred embodiment, the fluorinated α-olefin monomer is one or more of tetrafluoroethylene ($CF_2=CF_2$), chlorotrifloroethylene ($CClF=CF_2$), vinylidene fluoride ($CH_2=CF_2$) and hexafluoropropylene ($CF_2=CFCF_3$). Suitable fluoropolymers and methods for making such fluoropolymers are known, see, e.g., U.S. Pat. Nos. 3,671,487, 3,723,373 and 3,383,092.

Suitable fluorinated α-olefin homopolymers include e.g., poly(tetra-fluoroethylene), poly(hexafluoroethylene).

Suitable fluorinated α-olefin copolymers include copolymers comprising repeating units derived from two or more fluorinated α-olefin copolymers such as, e.g., poly(tetrafluoroethylene-hexafluoroethylene), and copolymers comprising repeating units derived from one or more fluorinated monomers and one or more non-fluorinated monoethylenically unsaturated monomers that are copolymerizable with the fluorinated monomers such as, e.g., poly(tetrafluoroethylene-ethylene-propylene) copolymers. Suitable non-fluorinated monoethylenically unsaturated monomers include e.g., α-olefin monomers such as, e.g., ethylene, propylene, butene, (meth)acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, vinyl versatate.

In a highly preferred embodiment, the fluoropolymer is a poly(tetrafluoroethylene) homopolymer ("PTFE").

In a preferred embodiment, the fluoropolymer is in the form of an aqueous dispersion of fluoropolymer particles. In a more highly preferred embodiment, the particle sizes of the fluoropolymer particles range from 50 to 500 nanometers ("nm"), as measured by electron microscopy.

(b) Fatty Acid Salt

In a preferred embodiment, the fatty acid salt is the saponification reaction product of a base with a carboxylic acid having a structural formula (1):

$$R^1COOH \qquad (1)$$

where $R^1$ is H, alkyl, cycloalkyl, aryl or $HOOC-(CHx)_n-$;

X=0, 1, 2; and n=0–70.

In a preferred embodiment, $R^1$ is $(C_1-C_{30})$alkyl or $(C_4-C_{12})$cycloalkyl. As used herein, the term "$(C_1-C_{30})$ alkyl" means a straight or branched alkyl substituent group having from 1 to 30 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl, dodecyl, stearyl, eicosyl, the term "$(C_4-C_{12})$ cycloalkyl" means a cyclic alkyl substituent group having from 4 to 12 carbon atoms per group, e.g., cyclohexyl, cylcooctyl and the term "aryl" means an organic radical derived from an aromatic hydrocarbon by removal of one hydrogen atom, which may optionally be substituted on the aromatic ring with one or more substituent groups, such as, e.g., phenyl, tolyl, naphthyl.

Suitable carboxylic acids include:

(i) monocarboxylic acids such as, e.g., formic acid, acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, hexacosanoic acid, octacosanoic acid, triacontanoic acid, 9c-dodecanoic acid, 9c-tetradecenoic acid, 9c-hexadecenoic acid, 6c-octadecenoic acid, 6t-octadecenoic acid, 9c-octadecenoic acid, 9t-octadecenoic acid, 12-hydroxy-9c-octadecenoic acid, 9c, 12c-octadecadienoic acid, 9t, 12t-octadecadienoic acid, 9c, 12c, 15c-octadecatrienoic acid, 9c, 11t, 13t-octadecatrienoic acid, 9t, 11t, 13t-octadecatrienoic acid, 9c-eicosanoic acid, 5, 8, 11, 14-eicosatrienoic acid, 13c-docosenoic acid, 13t-docosenoic acid, 4, 8, 12, 15, 19-docosapentaenoic acid, 15c-tetracosenoic acid, 17c-hexacosenoic acid, 21c-tricontenoic acid, isostearic acid; and (ii) dimer or trimer fatty acids, including, e.g., dimers or trimers of straight chain or cyclic alipahatic or aromatic ($C_{14}-C_{22}$) fatty acids Convenient commercially available sources of suitable carboxylic acids include, e.g., fats and oils, such as, e.g., tallow fatty acid, tall oil fatty acid, tall oil rosin or tall oil rosin fatty acid, babassu oil, coconut oil, palm kernel oil, corn oil, cottonseed oil, canola oil, rapeseed oil, low erucic acid rapeseed oil, groundnut oil, olive oil, palm oil, safflower oil, sesame oil, sunflower oil, linseed oil, soybean oil, oiticica oil, tung oil, castor oil, tall oil, butterfat, lard, tallow, herring oil, menhaden oil, sardine oil, whale oil, animal oil, butter, coco, cocoa butter, essential, fish oil, hide grease, lanolin, marine oil, poppy oil, rice bran oil, soya, sperm oil, tuna oil, vegetable oil, saturated vegetable oil, unsaturated vegetable oil, wheat germ oil.

Preferred fatty acids include tallow fatty acid, such as, e.g., Proctor & Gamble T-11, available from Proctor & Gamble Co., 11530 Reed Hartman Highway, Cincinnati, Ohio 45241, tall oil fatty acid, such as, e.g., Westvaco 1480 tall oil fatty acid, available from Westvaco Chemical Division, P.O. Box 70848, Charleston Heights, S.C. 29415-0848, and tall oil rosin or rosin acids, such as, e.g., Arizona Chemical Co. DRS series, available from Arizona Chemical Co., 1001 E. Business Highway 98, Panama City, Fla. 32401. A preferred fatty acid dimer is a dimer of a $C_{36}$ fatty acid, known as PRIPOL™ 1008, available from Unichema North America, 4650 S. Racine Ave., Chicago, Ill. 60609.

In a preferred embodiment, the base is:

(i) a hydroxyl compound according to formula (2):

$$XOH \qquad (2)$$

wherein X is sodium, lithium, potassium or ammonium, or (ii) an amine according to the formula (3):

$$N(R^2)_3 \qquad (3)$$

wherein $R^2$ is H, alkyl, hydroxyalkyl, aryl.

Suitable bases include metal hydroxides, such as, e.g., sodium hydroxide, lithium hydroxide or potassium hydroxide, ammonium hydroxide, and amines, such as, e.g., monoethanol amine, diethanol amine or triethanol amine.

In a preferred embodiment, the fatty acid salt is one according to formula (4):

$$R^1 COO^- M^+ \quad (4)$$

wherein $R^1$ is defined as above and $M^+$ is cation. Suitable cations include, e.g., a cationic residue of a base compound according to formula (2), such as, e.g., $Na^+$, $Li^+$, $K^+$, $NH_4^+$. In a highly preferred embodiment, $M^+$ is $K^+$, or $NH_4^+$.

In a preferred embodiment, the fatty acid salt exhibits a saponification number of from 50 to 250, preferably from 150 to 220 and most preferably from 200 to 215.

In a preferred embodiment, the fatty acid salt exhibits a pH of from 9 to 13.5, preferably from 11 to 13 and most preferably from 12 to 13.

In highly preferred embodiment, an organic compound is added to the fluoropolymer dispersion in an amount effective to further increase the mechanical stability of the dispersion. Preferably, from organic compound is added in an amount of from 5 pbw to 20 pbw organic compound per 100 pbw dispersion.

In a more highly preferred embodiment, the organic compound is selected from $(C_1-C_{20})$alkanes, such as, e.g., heptane, dodecane, cyclo$(C_6-C_{20})$alkanes, such as, e.g., cyclohexane, cyclooctane, and aryl compounds, which may optionally be substituted on the aromatic ring with one or more alkyl or alkenyl substituent groups, such as, e.g., benzene, naphthalene, styrene, α-methyl styrene. Most preferably, the organic compound is a vinyl aromatic monomer such as, e.g., styrene, α-methyl styrene.

The dispersion of the present invention is made by dispersing particles of the fluoropolymer in water in the presence of the fatty acid salt.

The dispersion of the present invention is useful in the same applications as an analogous fluoropolymer dispersion stabilized with ethoxylated nonyl phenol, with the advantage that the dispersion of the present invention is free of ethoxylated nonyl phenol.

II. Method for Making A Fluoropolymer Additive

A second aspect of the present invention is directed to a method for making a fluoropolymer additive. The method comprises combining a fluoropolymer, in the form of the aqueous fluoropolymer emulsion of the present invention, with a second polymer, precipitating the combined fluoropolymer and second polymer and then drying the precipitate to form the fluoropolymer additive. The method of the present invention avoids the use of ethoxylated nonyl phenol surfactant and thus does not generate any ethoxylated nonyl phenol-containing waste stream.

In a preferred embodiment, the emulsion polymerized fluoropolymer additive comprises from 30 to 70 wt %, more preferably 40 to 60 wt %, of the fluoropolymer and from 30 to 70 wt %, more preferably 40 to 60 wt %, of the second polymer.

In a highly preferred embodiment, the second polymer comprises repeating units derived from styrene and acrylonitrile. More preferably, the second polymer comprises from 60 to 90 wt % repeating units derived from styrene and from 10 to 40 wt % repeating units derived from acrylonitrile.

The fluoropolymer additive made by the process of the present invention is useful as an anti-drip and flame retardant additive in thermoplastic resin compositions.

(a) Emulsion Polymerization

In a first embodiment of the method of the present invention, a fluoropolymer additive is made by emulsion polymerization of one or more monoethylenically unsaturated monomers in the presence of the aqueous fluoropolymer dispersion of the present invention to form a second polymer in the presence of the fluoropolymer. The emulsion is then precipitated, e.g., by addition of sulfuric acid. The precipitate is dewatered, e.g., by centrifugation, and then dried to form a fluoropolymer additive that comprises fluoropolymer and an associated second polymer. The dry emulsion polymerized fluoropolymer additive is in the form of a free-flowing powder.

As used herein, the terminology "monoethylenically unsaturated" means having a single site of ethylenic unsaturation per molecule. Suitable monoethylenically unsaturated monomers include vinyl aromatic monomers, monoethylenically unsaturated nitrile and $(C_1-C_{12})$alkyl (meth)acrylate monomers, monoethylenically unsaturated carboxylic acids, hydroxy$(C_1-C_{12})$alkyl (meth)acrylate monomers; $(C_4-C_{12})$cycloalkyl (meth)acrylate monomers; (meth)acrylamide monomers and vinyl esters. As used herein, the term (meth)acrylate refers collectively to acrylates and methacrylates and term "(meth)acrylamide" refers collectively to acrylamides and methacrylamides.

Suitable vinyl aromatic monomers include, e.g., styrene and substituted styrenes having one or more alkyl, alkoxyl, hydroxyl or halo substituent group attached to the aromatic ring, including, e.g., α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers.

As used herein, the term "monoethylenically unsaturated nitrile monomer" means an acyclic compound that includes a single nitrile group and a single site of ethylenic unsaturation per molecule and includes, e.g., acrylonitrile, methacrylonitrile, α-chloro acrylonitrile.

Suitable $(C_1-C_{12})$alkyl (meth)acrylate monomers include $(C_1-C_{12})$alkyl acrylate monomers, e.g., ethyl acrylate, butyl acrylate, iso-pentyl acrylate, n-hexyl acrylate, 2-ethyl hexyl acrylate, and their $(C_1-C_{12})$alkyl methacrylate analogs such as, e.g., methyl methacrylate, ethyl methacrylate, propyl methacrylate, iso-propyl methacrylate, butyl methacrylate, hexyl methacrylate, decyl methacrylate. Suitable monoethylenically unsaturated carboxylic acids include, e.g., acrylic acid, methacrylic acid, itaconic acid. Suitable hydroxy $(C_1-C_{12})$alkyl (meth)acrylate monomers include, e.g., hydroxyethyl methacrylate; $(C_4-C_{12})$cycloalkyl (meth) acrylate monomers include, e.g., cyclohexyl methacrylate. Suitable (meth)acrylamide monomers include, e.g., acrylamide and methacrylamide. Suitable vinyl esters include, e.g., vinyl acetate and vinyl propionate.

In a preferred embodiment, the one or more monoethylenically unsaturated monomers comprise one or more monomers selected from vinyl aromatic monomers, monoethylenically unsaturated nitrile monomer and $(C_1-C_{12})$alkyl (meth)acrylate monomers.

The emulsion polymerization reaction mixture may, optionally, include a minor amount, e.g., up to 5 percent by weight (wt %), of a polyethylenically unsaturated "crosslinking" monomer, e.g., butylene diacrylate, divinyl benzene, butene diol dimethacrylate, trimethylolpropane tri (meth)acrylate. As used herein, the term "polyethylenically unsaturated" means having two or more sites of ethylenic unsaturation per molecule.

The emulsion polymerization reaction mixture may optionally include emulsified or dispersed particles of a third polymer, such as, e.g., an emulsified butadiene rubber latex.

In a preferred embodiment, the fatty acid salt present in the stabilized fluoropolymer dispersion is the only surfactant used to stabilize the reaction mixture during the emulsion polymerization reaction.

Optionally, an additional amount, e.g., up to about 2 pbw of the fatty acid salt per 100 pbw aqueous medium, may be added to the reaction mixture to enhance the stability of the reaction mixture during the emulsion polymerization reaction. Alternatively and less preferably, minor amounts, i.e., up to 4 pbw per 100 pbw fatty acid salt, of other stabilizers, e.g., anionic surfactants, such as, e.g., sodium alkyl sulfate, sodium alkyl sulfonate, sulfonic acid, may be added to the reaction mixture to enhance the stability of the reaction mixture during the emulsion polymerization reaction.

The emulsion polymerization reaction is initiated using a conventional free radical initiator such as, e.g., an organic peroxide compound, such as e.g., benzoyl peroxide, a persulfate compound, such as, e.g., potassium persulfate, an azonitrile compound such as e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate.

A chain transfer agent such as, e.g., a ($C_9$–$C_{13}$) alkyl mercaptan compound such as nonyl mercaptan, t-dodecyl mercaptan, may, optionally, be added to the reaction vessel during the polymerization reaction to reduce the molecular weight of the second polymer. In a preferred embodiment, no chain transfer agent is used.

In a preferred embodiment, the stabilized fluoropolymer dispersion is charged to a reaction vessel and heated with stirring. The initiator system and the one or more monoethylenically unsaturated monomers are then charged to the reaction vessel and heated to polymerize the monomers in the presence of the fluoropolymer particles of the dispersion to thereby form the second polymer.

In a more highly preferred embodiment, water, a fatty acid salt and a first portion of the one or more ethylenically unsaturated monomers to be polymerized are charged to a reaction vessel, the fluoropolymer dispersion is then charged to the reactor and the mixture so formed is heated with stirring to bring the reaction mixture to polymerization conditions and thereby begin the polymerization reaction. The reaction mixture is then maintained under polymerization conditions while streams of the initiator system and the remaining portion of the one or more ethylenically unsaturated monomers are then fed into the reaction mixture at controlled respective rates to polymerize the monomers in the presence of the fluoropolymer particles of the dispersion. The presence of a portion of the ethylenically unsaturated monomer charge in the initial reaction mixture imparts additional mechanical stability to the aqueous fluoropolymer dispersion by virtue of the presence, as noted above, of an organic compound in the dispersion. Preferably, the first portion of ethylenically unsaturated monomer charged to the reactor is a vinyl aromatic monomer, even more prefereably styrene or c-methyl styrene.

In a preferred embodiment, the second polymer exhibits a weight average molecular weight ("$M_w$") of from $75 \times 10^3$ to $800 \times 10^3$, a number average molecular weight ("$M_n$") of from $30 \times 10^3$ to $200 \times 10^3$ and a polydispersity ($M_w/M_n$) of less than or equal to 6.

In a preferred embodiment, the emulsion polymerized fluoropolymer additive powder exhibits a bulk density of from 15 to 35 pounds per cubic foot.

In a preferred embodiment, the particle size distribution of the fluoropolymer additive powder is such that the powder will pass through a 6 mesh screen, more preferably through a 20 mesh screen.

(b) Co-coagulation

In a second and less preferred embodiment, the fluoropolymer additive of the present invention is made by co-coagulating above described aqueous fluoropolymer dispersion with an aqueous emulsion of a second polymer. The co-coagulated fluoropolymer and second polymer is then precipitated, dewatered and dried to form the fluoropolymer additive.

Polymers suitable as the second polymer for use in the co-coagulation embodiment of the process of the present invention include those derived by emulsion polymerization of one or more of the monoethylenically unsaturated monomers discussed above in regard to the emulsion polymerization embodiment of the process of the present invention. In a preferred embodiment, the second polymer is a styrene-acrylonitrile resin or an acrylonitrile-butadiene-styrene resin.

In a preferred embodiment, the aqueous emulsion of the second polymer comprises from 25 to 60 wt %, more preferably form 35 to 55 wt % and still more preferably, from 45 to 50 wt % of particles of the second polymer.

In general, techniques for co-coagulating a fluoropolymer dispersion and an polymer emulsion are known in the art. In the present method, the aqueous fluoropolymer dispersion of the present invention is mixed with an aqueous emulsion of a second polymer. In a preferred embodiment, from 0.5 to 99.5 pbw, more preferably from 10 to 90 pbw and, even more preferably, from 40 to 60 pbw, of the aqueous fluoropolymer dispersion of the present invention is mixed with from 0.5 to 99.5 pbw, more preferably from 10 to 90 pbw and, even more preferably, from 40 to 60 pbw, of the aqueous resin emulsion.

The aqueous mixture of the fluoropolymer and second polymer is then co-coagulated and precipitated by addition of an acid, e.g., acetic acid, sulfuric acid, phosphoric acid, or a salt, e.g, calcium chloride, magnesium sulfate, aluminum sulfate. The precipitate is then dewatered and dried to form the co-coagulated fluoropolymer additive in the form of dry particles.

While the co-coagulated fluoropolymer additive is tractable, it exhibits an undesirable tendency to form clumps which tend to complicate handling of the co-coagulated fluoropolymer additive and hinder mixing of the co-coagulated fluoropolymer additive with other resins.

III. Method For Making A Fluoropolymer-containing Thermoplastic Resin Composition The fluoropolymer additive made by the process of the present invention is blended with a thermoplastic resin as an anti-drip and flame retardant additive.

In a preferred embodiment, the thermoplastic resin composition comprises from 0.01 to 5 pbw fluoropolymer per 100 pbw thermoplastic resin.

(a) Thermoplastic Resins

The thermoplastic resin matrix may be any thermoplastic polymer such as, e.g., poly(styrene) resins, poly(α-methyl styrene) resins, poly(vinyl chloride) resins, poly (acrylonitrile-butadiene-styrene ) resins, acrylonitrile-butadiene-styrene graft copolymer resins, methacrylate-butadiene-styrene graft copolymer resins, acrylonitrile-styrene-acrylate graft copolymer resins, polyester resins, polycarbonate resins, as well as blends thereof, such as, e.g., polycarbonate resin-polyester resin blends, polycarbonate resin acrylonitrile-butadiene-styrene graft copolymer resin blends.

(i) Graft Copolymers

Suitable graft copolymers comprise a rubbery polymeric phase and a rigid polymeric phase, wherein at least a portion of the rigid polymeric phase is chemically grafted to the rubbery polymeric phase.

In a preferred embodiment, the rubbery polymeric phase exhibits a glass transition temperature ("$T_g$") of less than 0° C. and comprises repeating units derived from one or more monoethylenically unsaturated monomers selected from conjugated diene monomers, ($C_1$–$C_{12}$)alkyl acrylate monomers, monoethylenically unsaturated nitrile monomers and vinyl aromatic monomers. As used herein, the $T_g$ of a polymer is that measured by differential scanning calorimetry (heating rate 20° C./minute, $T_g$ value determined at inflection point) of the polymer.

Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2, 4, hexadiene, dichlorobutadiene, bromobutadiene and dibromobutadiene as well as mixtures of conjugated diene monomers. In a preferred embodiment, the conjugated diene monomer of the vinyl aromatic-conjugated diene block copolymer is 1,3-butadiene.

Suitable ($C_1$–$C_{12}$)alkyl acrylate monomers, monoethylenically unsaturated nitrile monomers and vinyl aromatic monomers are those disclosed above in the discussion of making a fluoropolymer additive of the resent invention by emulsion polymerization.

In a preferred embodiment, the rubbery polymeric phase comprises from 30 to 90 wt % repeating units derived from one or more conjugated diene monomers and from 10 to 70 wt % repeating units derived from one or more monomers selected from vinyl aromatic monomers and monoethylenically unsaturated nitrile monomers.

The rubbery polymeric phase may optionally include, at a level of up to 50 wt % of the total weight of the rubbery polymeric phase, of repeating units derived from one or more other copolymerizable ethylenically unsaturated monomers, provided that the above $T_g$ limitation is satisfied. Suitable monoethylenically unsaturated monomers that are copolymerizable with the above described monomers include, e.g., the monoethylenically unsaturated carboxylic acids, hydroxy($C_1$–$C_{12}$)alkyl (meth)acrylates, ($C_4$–$C_{12}$) cycloalkyl (meth)acrylate monomers, (meth)acrylamides, vinyl esters disclosed above.

The rubbery polymeric phase may, optionally, include a minor amount, e.g., up to 5 wt %, of repeating units derived from a polyethylenically unsaturated "crosslinking" monomer, e.g., butylene diacrylate, divinyl benzene, butene diol dimethacrylate, trimethylolpropane tri(meth)acrylate. As used herein, the term "polyethylenically unsaturated" means having two or more sites of ethylenic unsaturation per molecule.

The rubbery polymeric phase may, particularly in those embodiments wherein the rubbery phase has repeating units derived from alkyl (meth)acrylate monomers, include a minor amount, e.g., up to 3 wt % of repeating units derived from a polyethylenically unsaturated "graftlinking" monomer, e.g., allyl methacrylate, diallyl maleate, triallyl cyanurate, wherein the sites of ethylenic unsaturation have substantially different reactivities from the monoethylenically unsaturated monomers from which the respective phase or superstrate is derived.

In a first highly preferred embodiment, the rubbery polymeric phase comprises repeating units derived from one or more conjugated diene monomers and one or more copolymerizable comonomers, preferably selected from vinyl aromatic monomers and monoethylenically unsaturated nitrile monomers, such as, e.g., styrene-butadiene copolymers, acrylonitrile-butadiene copolymers and styrene-butadiene-acrylonitrile copolymers. In a very highly preferred embodiment, the phase comprises from 60 to 95 wt % repeating units derived from one or more conjugated diene monomers and from 5 to 40 wt % repeating units derived from copolymerizable comonomers.

In a second highly preferred embodiment, the rubbery polymeric phase comprises repeating units derived from one or more ($C_1$–$C_{12}$)alkyl acrylate monomers, more preferably from one or more monomers selected from ethyl acrylate, butyl acrylate and n-hexyl acrylate.

Suitable rubbery polymeric phases are made by known processes, e.g., emulsion polymerization and mass polymerization.

In a preferred embodiment, the rubbery polymeric phase is made by aqueous emulsion polymerization in the presence of a free radical initiator, e.g., an organic peroxide or persulfate initiator or a redox initiator system, and, optionally, in the presence of a chain transfer agent, e.g., an alkyl mercaptan. In a preferred embodiment, the emulsion polymerized rubbery polymeric phase is in particulate form and has a weight average particle size of 50 to 1000 nanometers (nm), more preferably, of from 50 to 600 nm, as measured by light transmission. The rubbery polymeric phase may exhibit a unimodal particle size distribution or a multimodal distribution, e.g., a bimodal distribution. An exemplary bimodal distribution is one having from 50 to 80 wt % particles having particle sizes within a range of from, e.g., 80 to 180 nm, and 20 to 50 wt % having particle sizes within a range of from, e.g., from 250 to 1000 nm.

In a preferred embodiment, the rigid polymeric phase exhibits a $T_g$ of greater than or equal to 0° C. and comprises repeating units derived from one or more monomers selected from the group consisting of ($C_1$–$C_{12}$)alkyl (meth)acrylate monomers, vinyl aromatic monomers and monoethylenically unsaturated nitrile monomers and. Suitable vinyl aromatic monomers, ($C_1$–$C_{12}$)alkyl (meth)acrylate monomers and monoethylenically unsaturated nitrile monomers are those set forth above.

In a preferred embodiment, the graft copolymer comprises from 20 to 90 wt % and even more preferably, from 50 to 70 wt %, of the rubbery polymeric phase and from 10 wt % to 80 wt % and even more preferably, from 30 wt % to 50 wt %, of the rigid polymeric phase.

In a highly preferred embodiment, the rigid polymeric phase comprises repeating units derived from one or more monomers selected from styrene, -methyl styrene and acrylonitrile. In a more preferred embodiment, the rigid polymeric phase comprises from 60 to 90 wt % repeating units derived from styrene and from 10 to 40 wt % repeating units derived from acrylonitrile.

The rigid polymeric phase may optionally include, at a level of up to 50 wt % of the total weight of the rigid polymeric phase, of repeating units derived from one or more other copolymerizable ethylenically unsaturated monomers, provided that the above $T_g$ limitation is satisfied. Suitable monoethylenically unsaturated monomers that are copolymerizable with the above described monomers include, e.g., the monoethylenically unsaturated carboxylic acids, hydroxy($C_1$–$C_{12}$)alkyl (meth)acrylates, ($C_4$–$C_{12}$) cycloalkyl (meth)acrylate monomers, (meth)acrylamides, vinyl esters disclosed above.

The rigid polymeric phase may, optionally, include a minor amount, e.g., up to 3 wt %, more preferably up to 1.5 wt %, of repeating units derived from one or more polyethylenically crosslinking monomers. Suitable crosslinking monomers are disclosed above in regard to the composition of the rubbery polymeric phase particles.

The graft copolymer is made according to known processes, e.g., mass polymerization, emulsion polymerization, suspension polymerization or combinations thereof, wherein a portion of the rigid thermoplastic phase is chemically bonded, i.e., "grafted" to the elastomeric phase via reaction with unsaturated sites present in the elastomeric phase. The unsaturated sites in the elastomeric phase are provided, e.g., by residual unsaturated sites in repeating units derived from a conjugated diene or by residual unsaturated sites in repeating units derived from a graftlinking monomer.

In a preferred embodiment, the rigid thermoplastic phase is made by an aqueous emulsion or aqueous suspension polymerization reaction in the presence of elastomeric phase and a polymerization initiator system, e.g., a thermal or redox initiator system.

In a mass polymerization process, the material from which the elastomeric phase is to be formed is dissolved in a mixture of the monomers from which the rigid thermoplastic phase is to be formed and the monomers of the mixture are then polymerized to form to form the rubber modified thermoplastic resin.

In a preferred embodiment, from 15 to 70 wt % of the rigid polymeric phase is chemically grafted to the rubbery polymeric phase and from 30 to 85 wt % of the rigid polymeric phase remains non-grafted.

The rigid polymeric phase may be polymerized in a single step from a suitable monomer or suitable mixture of monomers or may be built up of two or more separately polymerized rigid polymeric phases of differing composition, e.g., of a methyl methacrylate phase and a separately polymerized styrene phase.

In a first highly preferred embodiment, the rigid polymeric phase comprises repeating units derived from one or more conjugated diene monomers, and may, optionally, further comprise repeating units derived from one or more monomers selected from vinyl aromatic monomers and monoethylenically unsaturated nitrile monomers, and the phase comprises repeating units derived from one or more monomers selected from vinyl aromatic monomers and monoethylenically unsaturated nitrile monomers, such as e.g., acrylonitrile-butadiene-styrene ("ABS") graft copolymers. Suitable ABS-type graft copolymers are commercially available, e.g., CYCOLAC™ resins from General Electric Company.

In a second highly preferred embodiment, the phase comprises repeating units derived from one or more ($C_1$–$C_{12}$)alkyl acrylates and the phase comprises repeating units derived from one or more monomers selected from vinyl aromatic monomers and monoethylenically unsaturated nitrile monomers, such as e.g., acrylonitrile-styrene-acrylate ("ASA") graft copolymers. Suitable ASA-type graft copolymers are available, e.g., GELOY™ resins from General Electric Company.

(ii) Aromatic Polycarbonate Resins

Aromatic polycarbonate resins suitable for use in the present invention, methods of making aromatic polycarbonate resins and the use of aromatic polycarbonate resins in thermoplastic molding compounds are well known in the art, see, generally, U.S. Pat. No. 5,411,999, the disclosure of which is incorporated herein by reference.

Aromatic polycarbonate resins are generally prepared by reacting a dihydric phenol, e.g., 2, 2-bis-(4-hydroxyphenyl) propane ("bisphenol A"), 2,2-bis(3,5-dimethyl-4-hydroxyphenyl)propane, bis(2-hydroxyphenyl) methane, 2,6-dihydroxy naphthalene, hydroquinone, 2,4'-dihydroxyphenyl sulfone and 4, 4'-dihydroxy-3, 3-dichlorophenyl ether, with a carbonate precursor, e.g., carbonyl bromide and carbonyl chloride, a halogen formate, a bishaloformate of a dihydric phenol, or a carbonate ester, e.g., diphenyl carbonate, dichlorophenyl carbonate, dinaphthyl carbonate, phenyl tolyl carbonate and ditolyl carbonate.

Suitable aromatic polycarbonate resins include linear aromatic polycarbonate resins, branched aromatic polycarbonate resins, and poly(ester-carbonate) resins.

Suitable linear aromatic polycarbonates resins include, e.g., bisphenol A polycarbonate resin.

Suitable branched aromatic polycarbonates are made, e.g., by reacting a polyfunctional aromatic compound, e.g., trimellitic anhydride, trimellitic acid, trimesic acid, trihydroxy phenyl ethane trimellityl trichloride, with a dihydric phenol and a carbonate precursor to form a branching polymer.

Suitable poly(ester-carbonate) copolymers are made, e.g., by reacting a difunctional carboxylic acid, terephthalic acid, 2,6-naphthalic acid, or a derivative of a difunctional carboxylic acid, e.g., an acid chloride, with a dihydric phenol and a carbonate precursor.

The preferred polycarbonates for use in the present invention are those derived from bisphenol A and phosgene and having an intrinsic viscosity of about 0.3 to about 1.5 deciliters per gram in methylene chloride at 25°.

Suitable aromatic polycarbonate resins are commercially available, e.g., LEXAN™ polycarbonate resins from General Electric Company.

(iii) Polyester Resins

Polyester resins suitable for use in the present invention, methods for making polyester resins and the use of polyester resins in thermoplastic molding compositions are well known in the art, see, generally, U.S. Pat. No. 5,411,999.

Suitable polyester resins include linear polyester resins, branched polyester resins, copolymeric polyester resins and mixtures or blends thereof. Suitable linear polyester resins include, e.g., poly(alkylene phthalate)s such as, e.g., poly (ethylene terephthalate) ("PET"), poly(butylene terephthalate) ("PBT"), poly(propylene terephthalate) ("PPT"), poly(cycloalkylene phthalate)s such as, e.g., poly (cyclohexanedimethanol terephthalate) ("PCT"), poly (alkylene naphthalate)s such as, e.g., poly(butylene-2,6-naphthalate) ("PBN") and poly(ethylene-2,6-naphthalate) ("PEN"), poly(alkylene dicarboxylates) such as, e.g., poly (cyclohexane dicarboxylate) Suitable copolymeric polyester resins include, e.g., polyesteramide copolymers, cyclohexanedimethanol-terephthalic acid-isophthalic acid copolymers and cyclohexanedimethanol-terephthalic acid-ethylene glycol ("PETG") copolymers.

In a preferred embodiment of the present invention, the polyester resin is selected from one or more of PBT and PET resins.

In a preferred embodiment, the polyester resin have an intrinsic viscosity of from about 0.4 to about 2.0 dl/g as measured in a 60:40 phenol/tetrachloroethane mixture or similar solvent at 23° C.–30° C.

Suitable polyester resins are commercially available, e.g., VALOX™ polyester resins from General Electric Company.

(iv) Resin Blends

Blends of the above disclosed thermoplastic resins are also suitable as the thermoplastic resin.

In a preferred embodiment, the thermoplastic resin is a blend of one or more polycarbonate resins with one or more polyester resins, more preferably a blend of from 10 pbw to 80 pbw of a polycarbonate resin with from 20 pbw to 90 pbw of a polyester resin. In a more highly preferred embodiment, the polycarbonate resin is a bisphenol A-type polycarbonate resin and the polyester resin is a poly(butylene terephthalate) resin or a poly(ethylene terephthalate) resin. Suitable polycarbonate resin-polyester resin blends are commercially available, e.g., XENOY™ resins from General Electric Company In an alternative preferred embodiment, the thermoplastic resin is a blend of one or more polycarbonate resins with one or more ABS resins, more preferably a blend of from 66 pbw to 99 pbw of a polycarbonate resin with from 1 pbw to 40 pbw of an ABS resin. In a more highly preferred embodiment, the polycarbonate resin is a bisphenol A polycarbonate resin. Suitable polycarbonate resin-ABS resin blends are commercially available, e.g., CYCOLOY™ resins from General Electric Company.

(v) Other Components (a) Flame Retardant Additives

In a preferred embodiment, the thermoplastic resin composition comprises an effective amount of a flame retardant additive to the composition. Suitable flame retardant additive are well known in the art and include, e.g., halogen-containing organic flame retardant compounds, organophosphate flame retardant compounds and borate flame retardant compounds.

Suitable halogen-containing flame retardant compounds include bromine-containing organic flame retardant compounds such as, e.g., terabromophthalimide, tribromophenoxymethane, bis(tribromophenoxy)ethane, tris(tribromophenyl)triphosphate, hexabromocyclodecane, decabromodiphenylether or a brominated epoxy resin, such as, e.g., copolymers of tetrabromobisphenol A and epichlorohydrin.

Suitable organophosphate flame retardant compounds include, e.g., phenyl bisdodecyl phosphate, ethyl diphenyl phosphate, resorcinol diphosphate, diphenyl hydrogen phosphate, tritolyl phosphate, 2-ethylhexyl hydrogen phosphate.

In a highly preferred embodiment the thermoplastic resin composition includes from about 1 pbw to 35 pbw of the flame retardant additive per 100 pbw of the thermoplastic resin composition.

In a preferred embodiment, the thermoplastic resin composition further comprises, i.e., in addition to a flame retardant additive, a metallic flame retardant synergist such as, e.g., oxides an carbonates of Group V metals, such as, e.g., $Sb_2O_3$, $Sb_2(CO_3)_3$, SbS, $Bi_2O_3$, and $Bi_2(CO_3)_3$.

In a highly preferred embodiment the thermoplastic resin composition includes from about 1 pbw to 10 pbw of the metallic flame retardant synergist per 100 pbw of the thermoplastic resin composition.

(b) Other Additives

Thermoplastic polymer compositions of the present invention may optionally also contain various conventional additives, such as:

(1) antioxidants, such as, e.g., organophosphites , e.g., tris(nonylphenyl)phosphite, (2,4,6-tri-tert-butylphenyl) (2-butyl-2-ethyl-1,3-propanediol)phosphite, bis(2,4-di-t-butylphenyl)pentaerythritol diphosphite or distearyl pentaerythritol diphosphite, as well as alkylated monophenols, polyphenols, alkylated reaction products of polyphenols with dienes, such as, e.g., butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4-hydroxyphenol)-propionic acid with monohydric or polyhydric alcohols, esters of beta-(5-tert-butyl-4-hydroxy- 3-methylphenyl)-propionic acid with monohydric or polyhydric alcohols, esters of beta-(5-tert-butyl-4-hydroxy-3-methylphenyl) propionic acid with mono-or polyhydric alcohols, esters of thioalkyl or thioaryl compounds, such as, e.g., distearylthiopropionate, dilaurylthiopropionate, ditridecylthiodipropionate, amides of beta-(3,5-di-tert-butyl-4-hydroxyphenol)-propionic acid;

(2) UV absorbers and light stabilizers such as, e.g., (i) 2-(2'-hydroxyphenyl)-benzotriazoles, 2-Hydroxy-benzophenones; (ii) esters of substituted and unsubstituted benzoic acids, (iii) acrylates, (iv) nickel compounds;

(3) metal deactivators, such as, e.g., N,N'-diphenyloxalic acid diamide, 3-salicyloylamino-1,2,4-triazole;

(4) peroxide scavengers, such as, e.g., ($C_{10}$–$C_{20}$)alkyl esters of β-thiodipropionic acid, mercapto benzimidazole;

(5) polyamide stabilizers;

(6) basic co-stabilizers, such as, e.g., melamine, polyvinylpyrrolidone, triallyl cyanurate; urea derivatives, hydrazine derivatives; amines, polyamides, polyurethanes;

(7) sterically hindered amines such as, e.g., triisopropanol amine or the reaction product of 2,4-dichloro-6-(4-morpholinyl)-1, 3, 5-triazine with a polymer of 1, 6-diamine, N, N'-Bis(-2, 2, 4, 6-tetramethyl-4-piperidenyl) hexane;

(8) neutralizers such as magnesium stearate, magnesium oxide, zinc oxide, zinc stearate, hydrotalcite;

(9) fillers and reinforcing agents, such as, e.g., silicates, $TiO_2$, glass fibers, carbon black, graphite, calcium carbonate, talc, mica;

(9) other additives such as, e.g., lubricants such as, e.g., pentaerythritol tetrastearate, EBS wax, silicone fluids, plasticizers, optical brighteners, pigments, dyes, colorants, flameproofing agents; anti-static agents; blowing agents.

The thermoplastic resin composition of the present invention is made, e.g., by melt blending the components, e.g., in a two-roll mill, in a Banbury mixer or in a single screw or twin-screw extruder equipped with kneading elements.

The thermoplastic resin composition can be formed into useful articles by a variety of means such as, e.g., injection, extrusion, rotation, and blow molding and thermoforming.

The thermoplastic resin composition of the present invention is particularly well suited for applications requiring flame retardant and drip resistant properties in articles such as, e.g., housings for consumer electronic products such as e.g., personal computers, housings for electrical appliances.

EXAMPLES 1–5

A 10 wt % aqueous solution of a tallow fatty acid potassium salt ("K⁺TFA") having a saponification number of 203.5 was prepared by combining 89.43 pbw demineralized water with 8.79 pbw of a tallow fatty acid (T-11, Proctor & Gamble), and 1.97 pbw potassium hydroxide. The T-11 tallow fatty acid nominally comprises from 38–43 wt % oleic acid, from 24–32 wt % palmitic acid, from 20–25 wt % stearic acid, from 3–6 wt % myristic acid and from 2–3 wt % linoleic acid.

The compositions of Examples 1–5 were made by combining the 10 wt % K⁺TFA solution with a raw PTFE dispersion that consisted of 34.9 to 46.0 wt % PTFE particles dispersed in water and exhibited a pH between 3.0 and 4.0 in a beaker and gently swirling the beaker to mix the materials. The relative amounts of $K^+TFA$ and PTFE are set forth below in TABLE 1, expressed as pbw $K^+TFA$ per 100 pbw PTFE on a dry weight basis.

The mechanical stability of the aqueous $K^+TFA/PTFE$ compositions of Examples 1–5 was monitored by measuring the time to destabilize a sample of dispersion upon mechanical shearing. A 40 milliliter (ml) sample of dispersion was placed in a 250 ml graduated cylinder and agitated a high speed (approximately 18,000 revolutions per minute ("rpm")) using a 1 inch diameter 0.065 inch thick mixing blade having 4 "S"-shaped high shear lobes and the time required to produce "curdling", i.e., a destabilization of the dispersion marked by a rapid increase in viscosity and typically accompanied by some phase separation, was recorded. A longer time indicates a more stable dispersion. Results of the stability testing, expressed in seconds (s), are set forth below in TABLE 1.

TABLE 1

| Example # | $K^+TFA$ (pbw per 100 pbw PTFE, dry basis) | Mechanical Stability (s) |
| --- | --- | --- |
| 1 | 0 | 3 |
| 2 | 0.5 | 8 |
| 3 | 1.0 | 15 |
| 4 | 2.0 | 120 |
| 5 | >2 | 120 |

EXAMPLES 6–13

A 10 wt % aqueous solution of a tallow fatty acid ammonium salt ("$NH_4^+TFA$") having a saponification number of 204 was prepared by combining 89.43 pbw demineralized water with 8.79 pbw of a tallow fatty acid (T-11, Proctor & Gamble), and 1.33 pbw ammonium hydroxide.

The compositions of Examples 6–13 were made by combining the 10 wt % $NH_4^+TFA$ solution with a raw PTFE dispersion that consisted of 34.9 to 46.0 wt % PTFE particles dispersed in water and exhibited a pH between 3.0 and 4.0 in a beaker and gently swirling the beaker to mix the materials. The relative amounts of $NH_4^+TFA$ and PTFE are set forth below in TABLE 2, expressed as pbw $NH_4^+TFA$ per 100 pbw PTFE on a dry weight basis.

The stability of each of the compositions of examples 6–13 was tested using the method set forth above in regard to Examples 1–5. Results of the stability testing, expressed in seconds (s), are set forth below in TABLE 2.

TABLE 2

| Example # | $NH_4^+-TFA$ (pbw per 100 pbw PTFE, dry basis) | Mechanical Stability (s) |
| --- | --- | --- |
| 6 | 0 | 3.5 |
| 7 | 0.5 | 13 |
| 8 | 1.0 | 18 |
| 9 | 2.0 | 69 |
| 10 | 2.5 | 240 |
| 11 | 3.0 | >300 |
| 12 | 3.5 | >300 |
| 13 | 4.0 | >300 |

EXAMPLES 14–34

The composition of Example 14 was a raw PTFE dispersion that consisted of 34.9 to 46.0 wt % PTFE particles dispersed in water having a pH between 3.0 and 4.0.

The composition of Example 15 was made by adjusting the pH of 1000 g of the raw PTFE dispersion of Example 14 to a value of 9.39 with 10 g of a 5% aqueous KOH solution.

The composition of Example 16 was made by adjusting the pH of 1000 g of the raw PTFE dispersion of Example 14 to a value of 9.39 with 12 g of triethanol amine.

The compositions of Examples 17 to 34 were each made by adding either ethoxylated nonyl phenol surfactant (TRITON X-100, Union Carbide corporation) or a 15% aqueous solution of the tallow fatty acid potassium salt described above in Example 1 to a respective one of the compositions of Examples 15–17. The relative amount of each of the components of the compositions of Examples 14–34 are set forth below in TABLE 3, expressed as pbw of KOH, triethanol amine ("TEA"), ethoxylated nonyl phenol ("ENP") or tallow fatty acid potassium salt ("$K^+TFA$") per 100 pbw dispersion.

The mechanical stability of each of the dispersions of examples 14–34 was measured by the method described above in Examples 1–5. Results are set forth below in TABLE 3.

TABLE 3

| Example No. | Base | Surfactant | Relative Amount of Surfactant (pbw/ 100 pbw dispersion) | pH | Mechanical Stability (s) |
| --- | --- | --- | --- | --- | --- |
| 14 | — | — | — | 3.29 | 2 |
| 15 | KOH | — | — | 9.39 | 3 |
| 16 | TEA | — | — | 9.39 | 2 |
| 17 | — | ENP | 2.0 | 3.8 | 6 |
| 18 | — | ENP | 3.0 | 3.82 | 300 |
| 19 | — | ENP | 4.0 | 3.77 | >900 |
| 20 | — | $K^+TFA$ | 1.0 | 9.1 | 5 |
| 21 | — | $K^+TFA$ | 2.0 | 10.7 | 300 |
| 22 | — | $K^+TFA$ | 3.0 | 11.16 | >900 |
| 23 | KOH | ENP | 1.0 | 9.75 | 3 |
| 24 | KOH | ENP | 2.0 | — | 2 |
| 25 | KOH | ENP | 3.0 | 9.83 | >900 |
| 26 | KOH | $K^+TFA$ | 1.0 | 10.9 | 14 |
| 27 | KOH | $K^+TFA$ | 3.0 | 11.82 | >900 |
| 28 | KOH | $K^+TFA$ | 5.0 | 12.04 | >900 |
| 29 | TEA | ENP | 1.0 | 9.43 | 3 |
| 30 | TEA | ENP | 2.0 | — | 12.5 |
| 31 | TEA | ENP | 3.0 | 9.41 | >900 |
| 32 | TEA | $K^+TFA$ | 1.0 | 10.0 | 14 |
| 33 | TEA | $K^+TFA$ | 2.0 | 10.74 | >900 |
| 34 | TEA | $K^+TFA$ | 3.0 | 11.02 | >900 |

EXAMPLES 35–44

The compositions of Examples 35–44 were made by combining a raw PTFE dispersion that consisted of 34.9 to 46.0 wt % PTFE particles dispersed in water having a pH between 3.0 and 4.0 with either an organic compound or a combination of an organic compound and a 10 wt % $K^+TFA$ solution. The relative amounts of $K^+TFA$ and organic compound are set forth below in TABLE 4, expressed as pbw per 100 pbw PTFE, on a dry weight basis.

The mechanical stability of each of the dispersions of examples 35–44 was measured by the method described above in Examples 1–5. Results are set forth below in Table 4.

TABLE 4

| Example # | K+TFA (pbw per 100 pbw PTFE, dry basis) | Organic Compound, pbw per 100 pbw PTFE | Mechanical Stability (s) |
|---|---|---|---|
| 35 | 0 | 10 pbw styrene | less than 10 |
| 36 | 2 | 5 pbw styrene | slightly >120 |
| 37 | 2 | 10 pbw styrene | >900 |
| 38 | 2 | 10 pbw α-methyl styrene | >900 |
| 39 | 2 | 10 pbw 4-vinyl cyclohexane | >900 |
| 40 | 2 | 10 pbw ethyl benzene | >900 |
| 41 | 2 | 10 pbw heptane | >900 |
| 42 | 2 | 10 pbw cyclohexane | 540 |
| 43 | 2 | 10 pbw methanol | 20 |
| 44 | 2 | 10 pbw tetrahydrofuran | 20 |

EXAMPLE 45

The fluoropolymer/thermoplastic resin composition of Example 45 was made by aqueous emulsion polymerization. Water (160 pbw), was charged to a jacketed, temperature controlled, sealed reaction vessel that was equipped with an agitator. The water was then heated to 100° F. Potassium hydroxide (0.05 pbw) was added to the heated water and the contents of the vessel were then stirred for 5 minutes. K+TFA stabilizer (2 pbw) having a saponification number of 204 was charged to the reaction vessel and the contents of the vessel were then stirred for 5 minutes. Styrene monomer (10 pbw) was charged to the reaction vessel and the contents of the reaction vessel were then heated to 135° F. with continued stirring. A raw PTFE dispersion (125 pbw) containing 40 wt % PTFE and 60 wt % water was slowly charged to the reaction vessel with slow stirring. Separate streams of cumene hydroperoxide (0.375 pbw), styrene monomer (27.5 pbw) and acrylonitrile monomer (12.5 pbw) were then fed to the reactor at substantially uniform respective rates over the respective time periods set forth below in TABLE 5.

TABLE 5

| Feed Stream | $t_{start}$ (minutes) | $t_{end}$ (minutes) |
|---|---|---|
| cumene hydroperoxide | 0 | 70 |
| acrylonitrile | 5 | 70 |
| styrene | 10 | 70 |

The temperature was ramped up according to the following schedule: 135° F. from t=0 to t=30 minute, 139° F. from t=30 minutes to t=35 minutes, 142° F. from t=35 minutes to t=40 minutes, 145° F. from t=40 minutes to t=70 minutes and 160° F. from t=70 minutes to t=135 minutes.

The contents of the reaction vessel were allowed to cool to 70° F. and the reaction product was precipitated by transferred contents of the reaction vessel to a second reaction vessel that contained a solution of $H_2SO_4$ (4 pbw) in water (96 pbw) at a temperature of about 205° F. After the transfer was completed, sufficient water was added to the second reaction vessel to drop the temperature of contents of the reaction vessel to 60° F. The contents of the second reaction vessel were then centrifuged and dried to produce a solid SAN/PTFE additive product. The product was obtained in the form of a free-flowing powder and had a styrene content of 36.5 wt %, an acrylonitrile content of 10.7 wt % and a PTFE content of 52.9 wt %, as measured by Fournier Transfer Infrared Spectroscopy. The styrene-acrylonitrile copolymer phase of the product exhibited a weight average molecular weight of $2.4 \times 10^5$ and a number average molecular weight of $5.2 \times 10^4$.

EXAMPLE 46

The fluoropolymer/thermoplastic resin composition of Example 46 was made by co-coagulating an aqueous PTFE dispersion with an aqueous styrene-acrylonitrile emulsion. A sample (50 g dry basis, 41 wt % solids) of a mixture of a K+TFA-stabilized aqueous PTFE dispersion (41 wt % solids) and an aqueous SAN copolymer emulsion (41% solids, 66.6 wt % styrene/33.4 wt % acrylonitrile) was coagulated at a temperature of 190° F. by addition of a solution of 1 milliliter (ml) concentrated sulfuric acid in 250 ml tap water. The coagulated slurry was held at 200° F., with vigorous agitation, for one minute and then quenched with 250 ml tap water. The slurry was dewatered in a laboratory centrifuge and the dewatered resin was dried in air at 230° F. until the moisture content of the resin was less than 2 wt %.

EXAMPLES 47–50

The compositions of Examples 47–50 were made by melt mixing 100 pbw of an ABS resin (20.5 wt % acrylonitrile/24.4 wt % butadiene/55.1 wt % styrene), a PTFE-containing additive, a tribromophenol-capped tetrabromobisphenol A/epichlorohydrin copolymer (EC-20, Reichhold Chemicals, Inc., bromine content 48–52 wt %), antimony trioxide, $TiO_2$ and other additives (stabilizers and lubricants) in an extruder, pelletizing the extrudate and molding test specimens from the pellets. The PTFE-containing additive was either an aqueous dispersion of PTEF (T-30, E.I. DuPont de Nemours & Co.) having a PTFE content of 60 wt % ("PTFE"), a co-coagulated blend of styrene-acrylonitrile resin and PTFE having a PTFE content of 46.3 wt % ("SAN/PTFE$^1$") or a PTFE/styrene-acrylonitrile resin additive made by semi-batch copolymerization according to the process set forth above in Example 45 having a PTFE content of 45 wt % ("SAN/PTFE$^2$"), The relative amount of each of the components of Examples 47–50 are set forth below in TABLE 6.

The Izod Impact (according to ASTM D-256) and Gardener Impact (according to ASTM D-3029, Method G) performance of each of the compositions of Examples 47–50 were measured and the compositions each were tested according to the protocol for UL 94 V0. Results are set forth below in TABLE 6, as Izod impact, expressed in foot-pounds force per inch at 23° C. ("Izod Impact (ft-lb/in)"), Gardner Impact, expressed as foot-pounds force at 23° C. ("Gardner Impact (ft-lb)"), average flame out time, expressed in seconds ("AFOT (s)") and the numbers of drips/burns and drips/no burns observed per five test samples.

TABLE 6

| Component | Ex #47 | Ex #48 | Ex #49 |
|---|---|---|---|
| ABS resin | 100 | 100 | 100 |
| PTFE | 0.173 | — | — |
| SAN/PTFE$^1$ | — | 0.216 | — |
| SAN/PTFE$^2$ | — | — | 0.222 |
| BR-epoxy | 24 | 24 | 24 |
| $Sb_2O_3$ | 9 | 9 | 9 |
| Colorants | 6.67 | 6.67 | 6.67 |
| Other Additives | 2.18 | 2.18 | 2.18 |
| Results | | | |
| Izod Impact (ft-lb/in) | 2.48 | 2.8 | 2.58 |
| Gardner | 12.27 | 13.33 | 19.22 |

TABLE 6-continued

| Component | Ex #47 | Ex #48 | Ex #49 |
|---|---|---|---|
| Impact (ft-lb) | | | |
| UL 94 V0 | V0 | V0 | V0 |
| AFOT | 2.0 | 1.6 | 1.0 |
| Drips/burns | 0 | 0 | 0 |
| Drips/no burns | 0 | 0 | 0 |

EXAMPLES 51–52

The flame retardant compositions of Examples 51–52 were made by melt mixing a bisphenol A polycarbonate resin ("BPA"), a tetrabromobisphenol A polycarbonate resin having a bromine content of 48–52 wt % ("TBBPA") and stabilizers and lubricants with either a co-coagulated ABS/PTFE blend made by the process of Example 46 and having a PTFE content of 46.3 wt % ("ABS/PTFE, co-coagulated") or a copolymerized SAN/PTFE resin made by the process set forth above in Example 45 and having a PTFE content of 45 wt % ("SAN/PTFE, copolymerized"), pelletizing the extrudate and molding the pellets into test specimens. The relative amount of each of the components of Examples 51–52 is set forth below in TABLE 7.

The melt volume index and Izod impact (according to ASTM D-256) performance of compositions of Examples 51 and 52 was measured and the compositions were tested according to the protocol of UL 94V0. Results for the compositions of Examples 51 and 52 are set forth below in TABLE 7 as melt volume index ("MVI"), Izod impact, expressed in foot-pounds force per inch ("Izod Impact (ft-lb/in)"), UL 94 V0 rating, average flame out time, expressed in seconds ("AFOT (s)"), maximum flame out time, expressed in seconds ("MFOT (s)") and the numbers of drips/burns and drips/no burns observed per five test samples.

TABLE 7

| Component | Example #51 | Example #52 |
|---|---|---|
| BPA (pbw)) | 100 | 100 |
| TBBPA (pbw) | 0.5 | 0.5 |
| ABS/PTFE, co-coagulated | 0.26 | — |
| ABS/PTFE, copolymerized | — | 0.27 |
| additives (pbw) | 0.92 | 0.92 |
| Results | | |
| MVI | 8.7 | 8.5 |
| Izod (ft-lb/in) | 16.6 | 17.6 |
| UL 94 V0 | V0 | V0 |
| AFOT (s) | 2.78 | 2.47 |
| MFOT (s) | 5.3 | 3.7 |
| Drip/burns | 0 | 0 |
| Drip/No burns | 0 | 0 |

EXAMPLES 53–54

The polyester resin compositions of Examples 53 and 54 were made by melt mixing a PTFE concentrate with a composition that included a polybutylene terephthalate resin ("PBT"), 14 μm chopped glass filler ("Glass"), antimony oxide ("$Sb_2O_3$") and tetrabromobisphenol A carbonate ("tetrabromo-BPA-C") and stabilizers and lubricants, as set forth below in TABLE 8. The PTFE concentrate was either a steam precipitated blend of 20 wt % PTFE and 80 wt % bisphenol A polycarbonate resin ("PC/PTFE") or a SAN/PTFE resin made according to the method of example 45 above and having a PTFE content of 50 wt % ("SAN/PTFE").

The compositions of Examples 53 and 54 were tested according to the protocol of UL 94V-0. Results of the testing are set forth below in TABLE 8 for each composition as the UL 94V-0 rating ("UL 94V-0"), the average duration of flame following first application of flame expressed in seconds ("$AFOT^1$ (s)"), the average duration of flame following second application of flame ("$AFOT^2$ (s)"), and the number of drips/burns ("drip/burns") per five test samples.

TABLE 8

| Component | Example 53 | Example 54 |
|---|---|---|
| PBT | 54.3 | 55.35 |
| Glass | 30 | 30 |
| $Sb_2O_3$ | 2.64 | 2.64 |
| tetra bromo-BPA-C | 8.84 | 8.84 |
| stabilizers/lubricants | 2.47 | 2.47 |
| PC/PTFE | 1.75 | — |
| SAN/PTFE | — | 0.7 |
| Results | | |
| UL 94 V-0 | V-2 | V-0 |
| $AFOT^1$ (s) | 0.9 | 2.7 |
| $AFOT^2$ (s) | 1.1 | 0.9 |
| drip/burns | 3 | 0 |

EXAMPLES 55–56

The polycarbonate resin/acrylonitrile-butadiene-styrene resin blend compositions of Examples 55 and 56 were made by melt mixing a PTFE concentrate with a composition that included a bisphenol A polycarbonate resin ("PC"), acrylonitrile-butadiene-styrene resin ("ABS"), styrene-acrylonitrile resin ("SAN"), an organophosphate fire retardant ("FR"), stabilizers and lubricants, as set forth below in TABLE 9. The PTFE concentrate was either a spray-dried blend of PTFE and a bisphenol A polycarbonate resin having a PTFE content of 20 wt % ("PC/PTFE") or a PTFE/SAN resin made according to the method of Example 45 above and having a PTFE content of 53 wt % ("SAN/PTFE").

The Izod impact and UL 94V0 performance of compositions 55 and 56 were tested. Results are set forth for each of the compositions in TABLE 9 below as Notched Izod Impact, expressed in foot-pounds force per inch (ft-lb/in) and average flame out time, 0.0625°, expressed in seconds, (AFOT (s)).

TABLE 9

| Components | Example #55 | Example #56 |
|---|---|---|
| PC | 69.7 | 69.7 |
| ABS | 9 | 9 |
| SAN | 8.6 | 8.6 |
| FR | 11.5 | 11.5 |
| Additives | 1.2 | 1.2 |
| PC/PTFE | 1 | — |
| SAN/PTFE | — | 0.47 |
| Results | | |
| Notched Izod Impact (ft-lb/in) | 10.2 | 10.5 |
| AFOT (s) | 4.2 | 5 |

The aqueous fluoropolymer dispersion of the present invention is free of ethoxylated nonyl phenol surfactants and exhibits high mechanical stability. The fatty acid salt of the stabilized aqueous fluoropolymer dispersion of the present invention is more effective, on a part-for-part basis, than an ethoxylated nonyl phenol surfactant with respect to stabilizing the fluoropolymer dispersion.

The respective methods of the present invention for making a fluoropolymer additive and method for making a thermoplastic resin composition each avoid the use of ethoxylated nonyl phenol and thus do not generate ethoxylated nonyl phenol-containing waste streams.

We claim:

1. A stabilized aqueous fluoropolymer dispersion, consisting essentially from 1 part by weight to 80 parts by weight fluoropolymer per 100 parts by weight of the dispersion and from 0.1 part by weight to 10 parts by weight of a fatty acid salt per 100 parts by weight of the fluoropolymer.

2. The dispersion of claim 1, wherein the fluoropolymer comprises one or more fluoropolymers selected from the group consisting of poly(tetrafluoro-ethylene), poly(hexafluoroethylene) and poly(tetrafluoro-ethylene-hexafluoroethylene).

3. The dispersion of claim 1, wherein the fatty acid salt is the saponification reaction product of a base and a tallow fatty acid, a tall oil fatty acid, a tall oil rosin or a tall oil rosin fatty acid.

4. The dispersion of claim 1, wherein the base is selected from the group consisting of sodium hydroxide, lithium hydroxide or potassium hydroxide, ammonium hydroxide, monoethanol amine, diethanol amine or triethanol amine.

5. The dispersion of claim 1, further comprising an organic compound selected from the group consisting of ($C_1$–$C_{20}$) alkanes, ($C_6$–$C_{20}$) cycloalkanes and aryl compounds, which may optionally be substituted on the aromatic ring with one or more alkyl or alkenyl substituent groups.

6. A method for making a fluoropolymer additive, comprising:

(a) combining a fluoropolymer, said fluoropolymer being in the form of a stabilized aqueous fluoropolymer dispersion comprising (i) from 1 pbw to 80 pbw fluoropolymer per 100 pbw of the dispersion and (ii) from 0.1 pbw to 10 pbw of a fatty acid salt per 100 pbw of the fluoropolymer, with a second polymer;

(b) precipitating the combined fluoropolymer and second polymer to form a precipitate; and (c) drying the precipitate to form the fluoropolymer additive.

7. The method of claim 6, wherein the fluoropolymer and second polymer are combined by co-coagulating an aqueous fluoropolymer dispersion with an aqueous emulsion of the second polymer.

8. The method of claim 6, wherein the second polymer is made by emulsion polymerizing one or more monoethylenically unsaturated monomers in the presence of the aqueous fluoropolymer dispersion.

9. The method of claim 8, wherein the second polymer comprises a styrene-acrylonitrile resin.

10. The method of claim 9, wherein the second polymer further comprises an acrylonitrile-butadiene-styrene resin.

11. A fluoropolymer additive made by the method of claim 6.

12. The fluoropolymer additive of claim 11, wherein the fluoropolymer additive comprises from 30 to 70 weight percent of the fluoropolymer and from 30 to 70 weight percent of the second polymer.

13. A method for making a fluoropolymer-containing thermoplastic resin composition, comprising:

(a) combining a fluoropolymer, said fluoropolymer being in the form of a stabilized aqueous fluoropolymer dispersion comprising (i) from 1 pbw to 80 pbw fluoropolymer per 100 pbw of the dispersion and (ii) from 0.1 pbw to 10 pbw of a fatty acid salt per 100 pbw of the fluoropolymer, with a second polymer;

(b) precipitating the combined fluoropolymer and second polymer to form a precipitate; and (c) drying the precipitate to form a fluoropolymer additive; and (d) blending the fluoropolymer additive with a thermoplastic resin to form the fluoropolymer-containing thermoplastic resin composition.

14. The method of claim 13, wherein the second polymer comprises a styrene-acrylonitrile resin.

15. The method of claim 13, wherein the thermoplastic resin comprises one or more resins selected from the group consisting of styrene-acrylonitrile resins, acrylonitrile-butadiene-styrene graft copolymer resins, acrylonitrile-styrene-acrylate graft copolymer resins, polycarbonate resins and polyester resins.

16. The method of claim 13, further comprising blending the fluoropolymer-thermoplastic resin additive and thermoplastic resin with a bromine-containing organic flame retardant compound or an organophosphate flame retardant compound.

17. A fluoropolymer-containing thermoplastic resin composition made by the method of claim 13.

18. The composition of claim 17, wherein the fluoropolymer-containing thermoplastic resin composition comprises from 0.01 to 5 parts by weight fluoropolymer per 100 parts by weight thermoplastic resin.

19. The composition of claim 15, wherein the thermoplastic resin comprises a styrene-butadiene-acrylonitrile graft copolymer resin.

20. The composition of claim 15, wherein the thermoplastic resin comprises a polycarbonate resin.

21. The composition of claim 15, wherein the thermoplastic resin comprises a polyester resin.

22. The composition of claim 15, wherein the thermoplastic resin comprises a styrene-butadiene-acrylonitrile graft copolymer resin and a polycarbonate resin.

* * * * *